United States Patent Office 2,807,531
Patented Sept. 24, 1957

2,807,531

PROCESS FOR TREATING ROLLING OIL

Louis Kovacs, Mimico, Ontario, Canada

No Drawing. Application December 14, 1954,
Serial No. 475,275

5 Claims. (Cl. 75—.5)

This application is a continuation-in-part of United States patent application Serial Number 156,526, filed April 18, 1950, now abandoned.

This invention relates to a process for treating rolling oils which have been used in the process of cold rolling of steel strip.

In the process of cold rolling of steel strip to light gauges, palm oil is employed as an aid in rolling. Other natural oils, animal fats and artificially compounded oil mixtures are also employed, especially in the rolling of heavier gauges. Some mills use the oils straight and apply it with air sprays, other spray mixture or emulsion of water and oil. Some mills use recirculating systems where a large quantity of the oil-water emulsion is flooding the work, in others a smaller quantity of oil is applied on the strip or on the rolls to be used only once and then discarded.

According to conventional practice, the effluent cooling liquid in the rolling process, containing spent rolling oil, is allowed to settle in sumps, pits or settling tanks. A black colored semi-solid supernatant sludge layer is skimmed off, heated in settling tanks, allowed to stand for periods ranging up to several months to remove water, dried by evaporating the remaining water, and sold as a by-product known, if it originated from pure palm oil, as "refuse palm oil." From the bottom of settling sumps or tanks a heavy sedimentary solid layer containing considerable quantities of oil is cleaned out periodically and discarded as waste. If the "refuse oil" is of mixed origin (other fatty oils and mineral oils being mixed with the palm oil) it is burned as fuel or dumped as waste. The "refuse palm oils" of pure palm oil origin available to the trade may be discarded material from the "hot dip tinning" process of the steel industry. This is a high temperature process in which a layer of hot palm oil covers the molten tin to protect it from the atmosphere. From this process "refuse palm oil" is regularly discarded and occasionally with it is mixed dry refuse oil from the cold mills if it is also of pure palm oil origin. The refuse palm oil is made into a product known as distilled palm oil fatty acids by fatty acid producers, but only by elaborate processing could it be made into re-usable rolling oils.

My said co-pending application, and a continuation-in-part application filed with respect thereto concurrently with this application, relate to the treatment of fresh rolling oils contained in the effluent cooling water after use in the rolling mills; they are concerned with separating fresh rolling oil after being employed in the cold rolling of steel strip from the cooling water and the treatment of it to make possible its re-use and they are mainly concerned with preventing the deterioration of the rolling oils into waste products.

The said applications disclose and claim novel techniques for handling the top and bottom sludges separated from the cooling water, which are based on the discovery that the sludges age rapidly and undergo radical chemical changes on storage or heating and that the conventional heating of the sludges accelerates the aging and rapidly turn the rolling oils into "waste" oils.

The rolling oil and the fine abraded iron particles are intimately mixed by the working of the rolling mill to a fine physical mixture. The oil leaving the mill dispersed in the effluent cooling water in the form of sludge is yet substantially unchanged re-usable oil, but the sludges formed and separated from the cooling water are so highly reactive and unstable that on standing the oil is rapidly deteriorated; the iron splits the glycerides and combines with the fatty acids, and the organic iron compounds formed increase in quantity and complexity. The more the sludges age in storage the less readily they respond to treatments of my co-pending applications, for once the oil is chemically deteriorated by aging to any substantial extent, complex refining techniques are required to make the oil re-usable and the discovery that this process of aging is a highly critical factor is the basis of these treatments.

To prevent chemical deterioration of the oils through aging the invention described and claimed in my co-pending applications requires the prompt collection of the sludges, either continuously or periodically at short intervals, and preferably within from a few minutes to at the most a few hours after use. In the freshly collected sludges the water-oil-iron mixture defies easy or quick mechanical separation by conventional handling but the treatments of my co-pending applications effectively break the emulsion and quickly separate the reactive contaminants from further contact with the rolling oil.

According to the invention described and claimed in my said co-pending applications, the basic treatment comprises the steps of boiling the freshly collected sludge with a suitable dilute acid and injecting live steam into the mass to heat and agitate the sludge simultaneously until what may be called the critical "green" stage is reached, at which stage a water-and-oil-insoluble green-black, somewhat slimy, precipitate is formed. If fresh wet sludges are used this precipitate includes the dark colored contaminants and if the fresh emulsion is completely broken this precipitate settles as a dark colored layer between the aqueous bottom layer and the supernatant clear oil layer. After settling the clear oil layer is removed and may be washed with water to remove traces of mineral acid and produce a re-usable oil without further treatment.

When the acid-treating process to which the said co-pending application relates is used the iron powder which constitutes on the average about 6% of the available re-usable rolling oil is nearly all consumed by the acid and this potentially valuable product is lost.

The object of this invention is to provide a treatment to recover the active free metallic iron, using conventional solvent extraction techniques on contaminated rolling oil sludges. The two by-products resulting from this solvent treatment, namely crude iron powder, a mixture of fine iron particles with shop dirt, and the dry contaminated rolling oil or sludge, are potentially valuable intermediary products. The dry sludge is conveniently and cheaply stored or transported without the danger of further aging, and is herein referred to as "stabilized" sludge.

The method according to this invention may therefore be used on freshly collected sludges to prevent deterioration of the oil before the main treatment of my said co-pending applications is used. It may also be used to recover iron powder alone, or iron powder and oil, from rolling oil, old sludges and bottom sediments where the oil has already become unsuitable for treatment by the methods of my said co-pending applications.

An important advantage of this invention results from the preservation of the iron powder while spent rolling oils are recovered and "stabilized" for further refining. This is achieved by the solvent treatment of the fresh sludges without acid treatment to separate the three reactive components of a fresh sludge, namely the oil, the water and the metallic iron.

The recovered "crude iron powder," with or without further purification, is a valuable intermediary product for powder metallurgy, for chemical reactions like the steam-iron-hydrogen process, for making pigments, for iron catalysts, alloys and other products. The recovered "stabilized" rolling oil by-product can be used as a valuable intermediary product in fat processing to make from it other products like fatty acids, glycerol, esters, soaps and other compounds by further processing.

The oil recovered from fresh sludges by the solvent treatment, without the use of acid, is contaminated only by a small quantity of iron soaps dissolved in it and it has a negligible quantity of free metallic iron suspended in it. It is usually a dark colour, free of water but it is slightly hygroscopic. In the dry state it is very stable and can be stored without further deterioration in quality.

Treating fresh sludges with the solvent method without acid results in the highest yield and best quality of both iron powder and stabilized spent rolling oil by-products but the invention of recovering the crude iron powder in the cold rolling operation by solvent methods is not limited to the fresh sludges. It is worth while to apply it for recovering the iron powder by-product from old sludges and from bottom sludges, and from sediments of settling tanks, sumps and ponds. These settlings are rich in iron powder content which can be profitably separated by the solvent methods of the invention from the oil and water in the mixture even though the recovered by-product oil may be of low quality and deteriorated by aging.

Effective methods, like the treatments disclosed and claimed in United States Patent 2,587,954 of Babayan are available for treating "refuse palm oil" and like by-products of the steel industry. This type of refuse oil may be refined by using a low concentration of acid, in the range of 1–5% based on the oil content of the refuse palm oil. Preferably phopshoric acid is used for this purpose in conjunction with an adsorbent bleaching. The oils recovered and separated from the iron powder by the solvent treatment of this invention, being very low or substantially free of metallic iron content are very suitably treated by the combination of the treatments of the said patent referred to.

The "stabilized spent rolling oil" resulting from the solvent treatment of fresh sludges according to the invention, if subsequently treated by the methods of the said patent, can result in re-usable oil. If it is of fatty acid origin like palm oil or tallow it may be used for soap stock with a good yield of glycerol.

According to the invention, the fresh or aged sludge, containing used rolling oil and solid impurities principally composed of metallic iron, is mixed with a suitable solvent for the oil, such as a suitable petroleum fraction or hexane, to extract the oil, thereby breaking the emulsion and freeing the iron particles from the oil, whereupon they are removed by one of a number of available methods. For instance, the water may be removed by distillation, and the solvent solution filtered to remove the solid impurities as crude iron powder. Or the extraction mixture of oil, solvent and water may be centrifuged and the solvent phase, water phase, and solid sediment containing the iron may be separated by decanting, or the iron may be removed from the extraction mixture by magnetic means, as by means of an electromagnetic stirring rod.

The following examples will illustrate the process:

*Example 1*

A sample of a fresh sludge containing 50% oil, 5% iron (10% based on oil content) and 45% water was mixed with an equal volume of a petroleum fraction (boiling range 100°–130° C.) and boiled in a distilling flask. Water and solvent vapours were condensed and separated and the solvent was returned to the flask. The solution when free of water was put through a filter paper. The filtered solution was boiled till all the solvent had evaporated. The recovered stabilized spent rolling oil was nearly 100% of the oil content of the sludge and the dried solids collected on the filter paper were 97% iron and represented substantially all of the free metallic iron content of the sludge.

*Example 2*

100 g. of a sludge containing 30% water, 66% oil and 4% iron (6% based on the oil content) was mixed with 200 cc. of benzol and heated to 65° C. It was centrifuged for three minutes and the three phases were separated by decanting. The benzol-oil phase (top) was boiled to evaporate the solvent; it contained substantially all the oil contained in the sludge. The clear water phase (middle) was decanted and discarded and the sediment phase containing all the iron powder was dried. It was 96% iron and represented nearly all the iron content of the sludge.

*Example 3*

A sample was collected from the bottom sediment of a settling pond which had about 26″ of sediments representing a gradual accumulation of sludge for three weeks. An average sample was collected and found to contain 38% iron, 23% water, 36% oil and 3% other solids.

100 g. of the sample was mixed with 300 cc. of commercial hexane solvent at room temperature (25° C.) and stirred with an electromagnetic stirring rod. The magnet was lifted out periodically from the slurry, demagnetized and wiped clean of the iron particles collected. The procedure was repeated till no more iron was collected on the rod and the yield was found to represent nearly 98% of the iron present in the slurry. The non-magnetic solids were not attracted by the rod.

Obviously, the process according to the invention may be carried out with any solvent which is a fat solvent; generally, obvious hydrocarbons, hexones, aldehydes, alcohols, ethers, esters, sulphides and halogenated solvents and mixtures of them may be used as fat solvents.

It is thought that the carrying out of the invention will be apparent from the above description. It is to be understood that the forms of the invention described are to be taken as preferred examples of the same and that various changes in the procedures and applications of the invention may be resorted to, without departing from the scope of the claims.

What I claim as my invention is:

1. A method of preventing deterioration of rolling oil contained in the effluent cooling liquid in the process of cold rolling of steel strip and of producing iron powder from the said oil, the said oil being emulsified with water and settled out from the main body of cooling water in the form of supernatant and sedimentary sludge which is contaminated with impurities including free metallic iron and iron compounds, which process comprises separating the fresh wet sludge from the cooling water, extracting the oil from the sludge with a fat solvent, and separating dry oil and dry iron powder from the water and the solvent and from each other.

2. A method of preventing deterioration of rolling oil contained in the effluent cooling liquid in the process of cold rolling of steel strip and of producing iron powder from the said oil, the said oil being emulsified with water and settled out from the main body of cooling water in the form of fresh supernatant and sedimentary sludge which is contaminated with impurities including free metallic iron and iron compounds, which process comprises promptly separating the fresh wet sludge from the cooling water, promptly extracting the oil from the fresh wet sludge with a fat solvent, and promptly separating dry oil and dry iron powder from the water and the solvent and from each other.

3. A method as claimed in claim 1 in which dry oil and dry iron powder are separated from the water and the solvent solution by filtration.

4. A method as claimed in claim 1 in which the iron, water and solvent solution is centrifuged and the water and the solvent solution are decanted from the iron powder in the sediment.

5. A method as claimed in claim 1 in which the iron particles are separated by inserting a magnet into the extraction mixture.

References Cited in the file of this patent

UNITED STATES PATENTS

| | | |
|---|---|---|
| 2,084,154 | Lutz | June 15, 1937 |
| 2,324,960 | Stewart | July 20, 1943 |